US012700368B2

(12) United States Patent
Gu et al.

(10) Patent No.: US 12,700,368 B2
(45) Date of Patent: Aug. 4, 2026

(54) DISPLAY DEVICE AND ELECTRONIC DEVICE INCLUDING THE SAME

(71) Applicant: SAMSUNG DISPLAY CO., LTD., Yongin-si (KR)

(72) Inventors: Bon-Seog Gu, Yongin-si (KR); Jinyoung Roh, Yongin-si (KR); Hae-Kwan Seo, Yongin-si (KR); Jaekeun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/266,467

(22) Filed: Jul. 11, 2025

(65) Prior Publication Data

US 2026/0038437 A1 Feb. 5, 2026

(30) Foreign Application Priority Data

Aug. 2, 2024 (KR) ........................ 10-2024-0103400

(51) Int. Cl.
*G09G 3/3233* (2016.01)
*G09G 3/32* (2016.01)

(52) U.S. Cl.
CPC ............ *G09G 3/3233* (2013.01); *G09G 3/32* (2013.01); *G09G 2300/0426* (2013.01); *G09G 2300/0439* (2013.01); *G09G 2300/0861* (2013.01); *G09G 2310/08* (2013.01); *G09G 2330/021* (2013.01)

(58) Field of Classification Search
None
See application file for complete search history.

(56) References Cited

U.S. PATENT DOCUMENTS 9,196,197 B2 11/2015 Kim
2006/0227081 A1* 10/2006 Joo ...................... H10K 59/131 345/76
2026/0038405 A1* 2/2026 Seo ...................... G09G 3/2003

FOREIGN PATENT DOCUMENTS

KR 10-0603456 B1 7/2006
KR 10-2015-0049121 A 5/2015

* cited by examiner

*Primary Examiner* — Ifedayo B Iluyomade
(74) *Attorney, Agent, or Firm* — F. CHAU & ASSOCIATES, LLC

(57) ABSTRACT

Disclosed is an electronic device including a first pixel connected to a data line and operating in response to a previous first scan signal, a current first scan signal, and a second scan signal, and a second pixel connected to the data line and operating in response to the current first scan signal, a next first scan signal, and the second scan signal. The first pixel and the second pixel are disposed in the same row. A first period in an active period of the current first scan signal overlaps an active period of the previous first scan signal. A second period of the active period of the k-th first scan signal overlaps an active period of the next first scan signal.

20 Claims, 9 Drawing Sheets

DISPLAY DEVICE AND ELECTRONIC DEVICE INCLUDING THE SAME

CROSS-REFERENCE TO RELATED APPLICATIONS

This patent application claims priority under 35 U.S.C. § 119 to Korean Patent Application No. 10-2024-0103400 filed on Aug. 2, 2024, in the Korean Intellectual Property Office, the disclosure of which is incorporated by reference in its entirety herein.

1. TECHNICAL FIELD

Embodiments of the present disclosure are directed to a display device and an electronic device including the display device.

2. DISCUSSION OF RELATED ART

Electronic devices that provide images to a user, such as a television (TV), a mobile phone, a tablet personal computer, a navigation system and a game console, include a display device to display the images. The display device generates the images and provides them to a user via its display screen.

The electronic device may include an organic light emitting display device. The organic light emitting display device may include a light emitting element, and the light emitting element may emit light by the recombination of electrons and holes. The organic light emitting electronic device has fast response speed and is driven with low power consumption.

In organic light emitting electronic devices where pixels share data lines, additional control circuits are typically required to manage data distribution, prevent signal interference, and ensure proper pixel operation. These control circuits add complexity, resulting in a larger non-display area, higher power consumption, increased manufacturing difficulty, and potential crosstalk and signal delays.

SUMMARY

Embodiments of the present disclosure provide a display device in which pixels share data lines while minimizing circuit complexity, thereby reducing power consumption and the non-display area, and an electronic device including the display device.

According to an embodiment, a display device includes a first pixel connected to a data line and operating in response to a previous first scan signal, a current first scan signal, and a second scan signal, and a second pixel connected to the data line and operating in response to the current first scan signal, a next first scan signal, and the second scan signal. The first pixel and the second pixel are disposed in the same row. A first period in an active period of the current first scan signal overlaps an active period of the previous first scan signal. A second period of the active period of the current first scan signal overlaps an active period of the next first scan signal.

In an embodiment, during the first period, a data signal provided to the data line may be provided to the first pixel, and during the second period, a data signal provided to the data line may be provided to the second pixel.

In an embodiment, the previous first scan signal, the current first scan signal, and the next first scan signal may sequentially transition to active levels.

In an embodiment, the first pixel may include a first capacitor, a first switching circuit that electrically connects the data line to the first capacitor in response to the previous first scan signal and the current first scan signal, and a first emission circuit that receives the second scan signal and emits light in response to a data signal stored in the first capacitor.

In an embodiment, the first switching circuit may include a first transistor connected between the first capacitor and a first node and including a gate electrode that receives the previous first scan signal, and a second transistor connected between the first node and the data line and including a gate electrode that receives the current first scan signal.

In an embodiment, the second pixel may include a second capacitor, a second switching circuit that electrically connects the data line to the second capacitor in response to the current first scan signal and the next first scan signal, and a second emission circuit that receives the second scan signal and emits light in response to a data signal stored in the second capacitor.

In an embodiment, the second switching circuit may include a third transistor connected between the second capacitor and a second node and including a gate electrode that receives the next first scan signal, and a fourth transistor connected between the second node and the data line and including a gate electrode that receives the current first scan signal.

In an embodiment, the first pixel may include an eleventh transistor connected between a first voltage line and an eleventh node and including a gate electrode connected to a twelfth node, a twelfth transistor connected between the twelfth node and a thirteenth node and including a gate electrode that receives the previous first scan signal, a thirteenth transistor connected between the thirteenth node and a fourteenth node and including a gate electrode that receives the current first scan signal, a fourteenth transistor connected between the fourteenth node and the eleventh node and including a gate electrode that receives the second scan signal, a first light emitting element connected between the eleventh node and a second voltage line, and a first capacitor connected between the twelfth node and a third voltage line.

In an embodiment, during the first period, the twelfth transistor and the thirteenth transistor may be turned on.

In an embodiment, the second pixel may include a 21st transistor connected between the first voltage line and a 21st node and including a gate electrode connected to a 22nd node, a 22nd transistor connected between the 22nd node and a 23rd node and including a gate electrode that receives the next first scan signal, a 23rd transistor connected between the 23rd node and a 24th node and including a gate electrode that receives the current first scan signal, a 24th transistor connected between the 24th node and the 21st node and including a gate electrode that receives the second scan signal, a second light emitting element connected between the 21st node and the second voltage line, and a second capacitor connected between the 22nd node and the third voltage line.

In an embodiment, during the second period, the 22nd transistor and the 23rd transistor are turned on.

According to an embodiment, an electronic device includes a display panel including a plurality of pixels, a plurality of first scan lines, a plurality of second scan lines, and a plurality of data lines, a scan driving circuit that provides first scan signals and second scan signals to the plurality of first scan lines and the plurality of second scan lines, respectively, and a data driving circuit that provides data signals to the plurality of data lines. The plurality of pixels include a first pixel disposed in a current row, connected to a first data line among the plurality of data lines, and operating in response to a previous first scan signal, a current first scan signal, and a second scan signal, and a second pixel disposed in the current row, connected to the first data line, and operating in response to the current first scan signal, a next first scan signal, and the second scan signal. A first period in an active period of the current first scan signal overlaps an active period of the previous first scan signal. A second period of the active period of the current first scan signal overlaps an active period of the next first scan signal.

In an embodiment, the previous first scan signal, the current first scan signal, and the next first scan signal may sequentially transition to active levels.

In an embodiment, the first pixel may include a first capacitor, a first switching circuit that electrically connects the first data line to the first capacitor in response to the previous first scan signal and the current first scan signal, and a first emission circuit that receives the second scan signal and emits light in response to a data signal stored in the first capacitor.

In an embodiment, the first switching circuit may include a first transistor connected between one end of the first capacitor and a first node and including a gate electrode that receives the previous first scan signal, and a second transistor connected between the first node and the first data line and including a gate electrode that receives the current first scan signal.

In an embodiment, the second pixel may include a second capacitor, a second switching circuit that electrically connects the first data line to the second capacitor in response to the current first scan signal and the next first scan signal, and a second emission circuit that receives the second scan signal and emits light in response to a data signal stored in the second capacitor.

In an embodiment, the second switching circuit may include a third transistor connected between one end of the second capacitor and a second node and including a gate electrode that receives the next first scan signal, and a fourth transistor connected between the second node and the first data line and including a gate electrode that receives the current first scan signal.

In an embodiment, the first pixel may include an eleventh transistor connected between a first voltage line and an eleventh node and including a gate electrode connected to a twelfth node, a twelfth transistor connected between the twelfth node and a thirteenth node and including a gate electrode that receives the previous first scan signal, a thirteenth transistor connected between the thirteenth node and a fourteenth node and including a gate electrode that receives the current first scan signal, a fourteenth transistor connected between the fourteenth node and the eleventh node and including a gate electrode that receives the second scan signal, a first light emitting element connected between the eleventh node and a second voltage line, and a first capacitor connected between the twelfth node and a third voltage line.

In an embodiment, during the first period, the twelfth transistor and the thirteenth transistor may be turned on.

In an embodiment, the second pixel may include a 21st transistor connected between the first voltage line and a 21st node and including a gate electrode connected to a 22nd node, a 22nd transistor connected between the 22nd node and a 23rd node and including a gate electrode that receives the next first scan signal, a 23rd transistor connected between the 23rd node and a 24th node and including a gate electrode that receives the k-th first scan signal, a 24th transistor connected between the 24th node and the 21st node and including a gate electrode that receives the second scan signal, a second light emitting element connected between the 21st node and the second voltage line, and a second capacitor connected between the 22nd node and the third voltage line.

In an embodiment, during the second period, the 22nd transistor and the 23rd transistor are turned on.

According to an embodiment, a display device includes a display panel and scan driving circuit. The display panel includes a plurality of pixels. The plurality of pixels include: a first pair of pixels disposed in a first row and connected to a same data line; and a second pair of pixels disposed in a second row and connected to a same data line. The scan driving circuit is configured to: apply a previous first scan signal, a current first scan signal and a second scan signal to the first pair of pixels; and apply the current first scan signal, a next first scan signal and the second scan signal to the second pair of pixels. A first period in an active period of the current first scan signal overlaps an active period of the previous first scan signal. A second period in the active period of the current first scan signal overlaps an active period of the next first scan signal.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
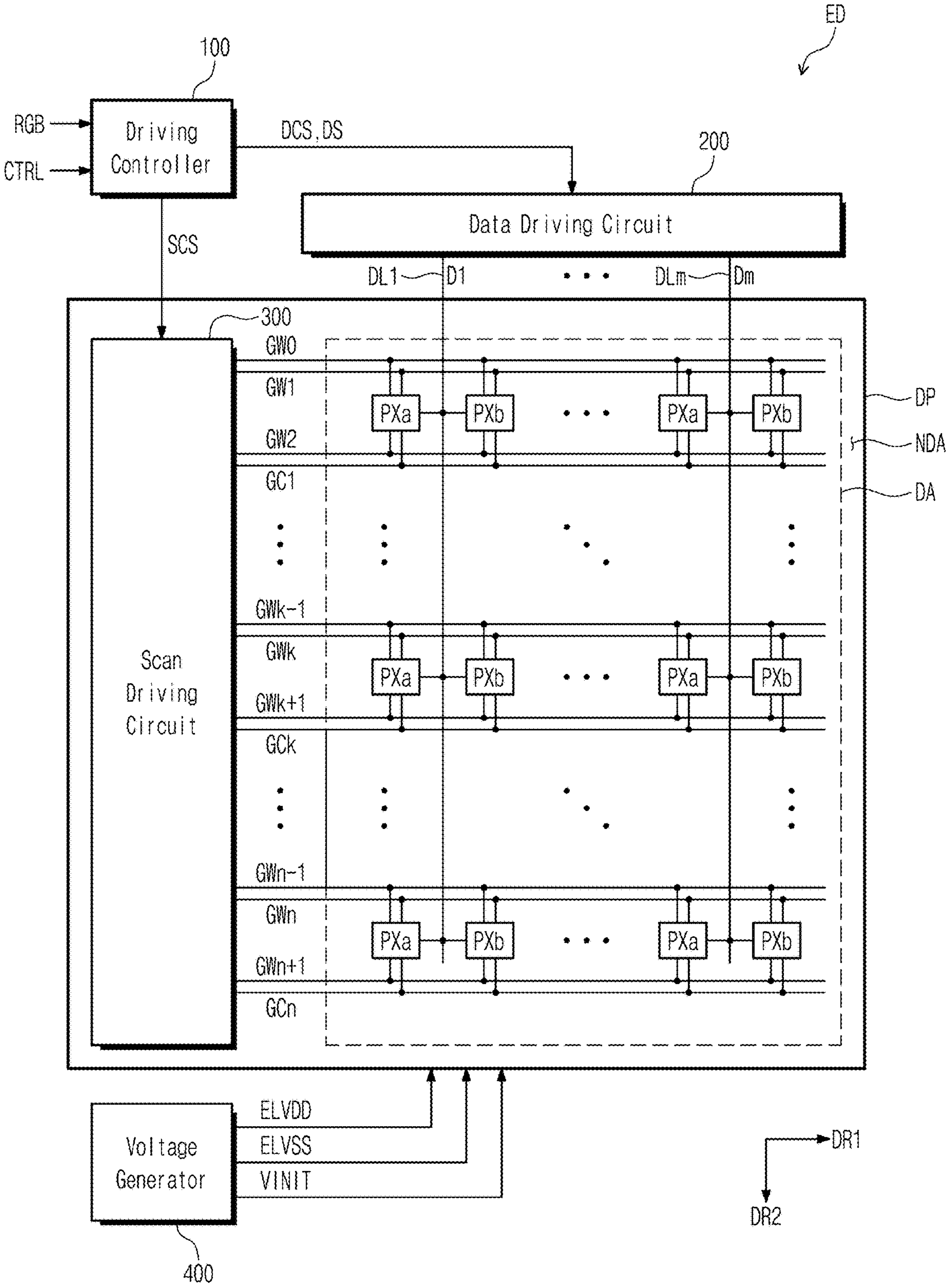
FIG. 1 is a block diagram of an electronic device, according to an embodiment of the present disclosure.

In the specification, the expression that a first component (or region, layer, part, etc.) is “on”, “connected with”, or “coupled with” a second component means that the first component is directly on, connected with, or coupled with the second component or means that a third component is interposed therebetween.

Like reference numerals refer to like components. The term “and/or” includes one or more combinations of the associated listed items. Although the terms “first”, “second”, etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Hereinafter, embodiments of the present disclosure will be described with reference to accompanying drawings.

Traditional display devices that allow pixels to share a data line typically require additional multiplexing circuits to manage data distribution and prevent crosstalk. These circuits introduce disadvantages such as higher power consumption, increased non-display area, and added circuit complexity. In contrast, embodiments of the present disclosure eliminate the need for separate multiplexing circuits by implementing a novel scanning and driving scheme.

In at least one embodiment of the present disclosure, two pixels in the same row share a data line but operate using overlapping scan signals instead of separate selection signals. The first pixel operates in response to a previous scan signal, a current scan signal, and a secondary scan signal, while the second pixel operates in response to the current scan signal, a next scan signal, and the secondary scan signal. By structuring the active periods of scan signals to overlap, data can be written to each pixel without requiring additional circuit elements for pixel selection.

This configuration may significantly reduce the area occupied by non-display components, leading to a more compact display design. Additionally, by removing extra control circuits, power consumption may be minimized while maintaining efficient data transmission.

FIG. 1 is a block diagram of an electronic device ED, according to an embodiment of the present disclosure.

Referring to FIG. 1, the electronic device ED includes a display panel DP, a driving controller 100 (e.g., a driving control circuit), a data driving circuit 200, a scan driving circuit 300, and a voltage generator 400.

According to an embodiment of the present disclosure, the display panel DP may include a light emitting display panel. For example, the display panel DP may be an organic light emitting display panel, an inorganic light emitting display panel, or a quantum dot light emitting display panel. A light emitting layer of the organic light emitting display panel may include an organic luminescent material. A light emitting layer of the inorganic light emitting display panel may include an inorganic luminescent material. A light emitting layer of the quantum dot light emitting display panel may include a quantum dot or a quantum rod. Hereinafter, in an embodiment, the description will be given under the condition that the display panel DP is an organic light emitting display panel.

The display panel DP includes first pixels PXa and second pixels PXb. For example, the first pixels PXa may be odd pixels and the second pixels PXb may be even pixels. In an embodiment, each of the first pixels PXa is directly adjacent to a corresponding one of the second pixels PXb in a given row.

Some of the first pixels PXa and some of the second pixels PXb are connected in common to one data line. For example, some (e.g., the first pixels PXa disposed in a first column) of the first pixels PXa and some (e.g., the second pixels PXb disposed in a second column) of the second pixels PXb are connected in common to a data line DL1. Some (e.g., the first pixels PXa disposed in a (2m−1)-th column) of the first pixels PXa and some (e.g., the second pixels PXb disposed in a 2m-th column) of the second pixels PXb are connected in common to a data line DLm. Here, 'm' is a positive integer. For example, one of the first pixels PXa and one of the second pixels PXb that are adjacent one another may be connected to a same data line.

Each of the first pixels PXa and the second pixels PXb may include a light emitting element and a pixel circuit that controls light emission of the light emitting element. In an embodiment, the light emitting element is an organic light emitting element, but is not limited thereto.

The driving controller 100 receives an input image signal RGB and a control signal CTRL. The driving controller 100 provides a data control signal DCS and an image data signal DS to the data driving circuit 200. The driving controller 100 provides a scan control signal SCS to the scan driving circuit 300.

The data driving circuit 200 receives the data control signal DCS and the image data signal DS from the driving controller 100. The data driving circuit 200 converts the image data signal DS into data signals based on the data control signal DCS and outputs the data signals to data lines DL1 to DLm. The data signals refer to analog voltages corresponding to the image data signal DS. The data lines DL1 to DLm may be disposed spaced apart from each other in a first direction DR1. Each of the data lines DL1 to DLm may extend in a second direction DR2 intersecting the first direction DR1.

The scan driving circuit 300 receives the scan control signal SCS from the driving controller 100. The scan driving circuit 300 outputs first scan signals GW0 to GWn+1 and second scan signals GC1 to GCn in response to the scan control signal SCS. The first scan signals GW0 to GWn+1 and the second scan signals GC1 to GCn may be provided to the first pixels PXa and the second pixels PXb. In an embodiment, the first scan signals GW0 to GWn+1 may sequentially transition to active levels, and the second scan signals GC1 to GCn may sequentially transition to active levels. In an embodiment, the first scan signals GW0 to GWn+1 and the second scan signals GC1 to GCn may be delivered to the first pixels PXa and the second pixels PXb through scan lines extending from the scan driving circuit 300 in the first direction DR1, respectively.

In an embodiment, the second scan signals GC1 to GCn are the same signal as each other. That is, the second scan signals GC1 to GCn provided to all of the first pixels PXa and the second pixels PXb of the display panel DP may have the same waveform as each other. That is, the second scan signals GC1 to GCn may be common signals.

In an embodiment, the scan driving circuit 300 is disposed on the display panel DP. In an embodiment, the first pixels PXa and the second pixels PXb are disposed in a display area DA of the display panel DP, and the scan driving circuit 300 is disposed in a non-display area NDA of the display panel DP. In an embodiment, the scan driving circuit 300 is formed using the same process as the first pixels PXa and the second pixels PXb, but the present disclosure is not limited thereto.

The first pixels PXa and the second pixels PXb, which are disposed in a first row among the first pixels PXa and the second pixels PXb, operate in response to the first scan signals GW0, GW1, and GW2 and the second scan signal GC1. In other words, the first pixels PXa and the second pixels PXb, which are disposed in the first row, may display an image corresponding to data signals provided from the data lines DL1 to DLm in response to the first scan signals GW0, GW1, and GW2 and the second scan signal GC1.

The first pixels PXa and the second pixels PXb, which are disposed in the k-th row among the first pixels PXa and the second pixels PXb, operate in response to the first scan signals GWk−1, GWk, and GWk+1 and the second scan signal GCk. Here, 'k' is a positive integer. In other words, the first pixels PXa and the second pixels PXb, which are disposed in the k-th row, may display an image corresponding to data signals provided from the data lines DL1 to DLm in response to the first scan signals GWk−1, GWk, and GWk+1 and the second scan signal GCk.

The first pixels PXa and the second pixels PXb, which are disposed in the n-th row among the first pixels PXa and the second pixels PXb, operate in response to the first scan signals GWn−1, GWn, and GWn+1 and the second scan signal GCn. In other words, the first pixels PXa and the second pixels PXb, which are disposed in the n-th row, may display an image corresponding to data signals provided from the data lines DL1 to DLm in response to the first scan signals GWn−1, GWn, and GWn+1 and the second scan signal GCn.

For example, when n=2 and k=1, the first pixels PXa and the second pixels PXb in the first row operate in response to the first scan signals GW0, GW1, and GW2, and a common second scan signal; the first pixels PXa and the second pixels PXb of the second row operate in response to the first scan signals GW1, GW2, and GW3, and the common second scan signal; and the first pixels PXa and the second pixels PXb in the third row operate in response to the first scan signals GW2, GW3, and GW4, and the common second scan signal.

The voltage generator 400 provides voltages (e.g., a first voltage ELVDD, a second voltage ELVSS, and a third voltage VINIT) used for the operation of the display panel DP. The number of voltages generated by the voltage generator 400 may be changed in various ways.

Figure 2:
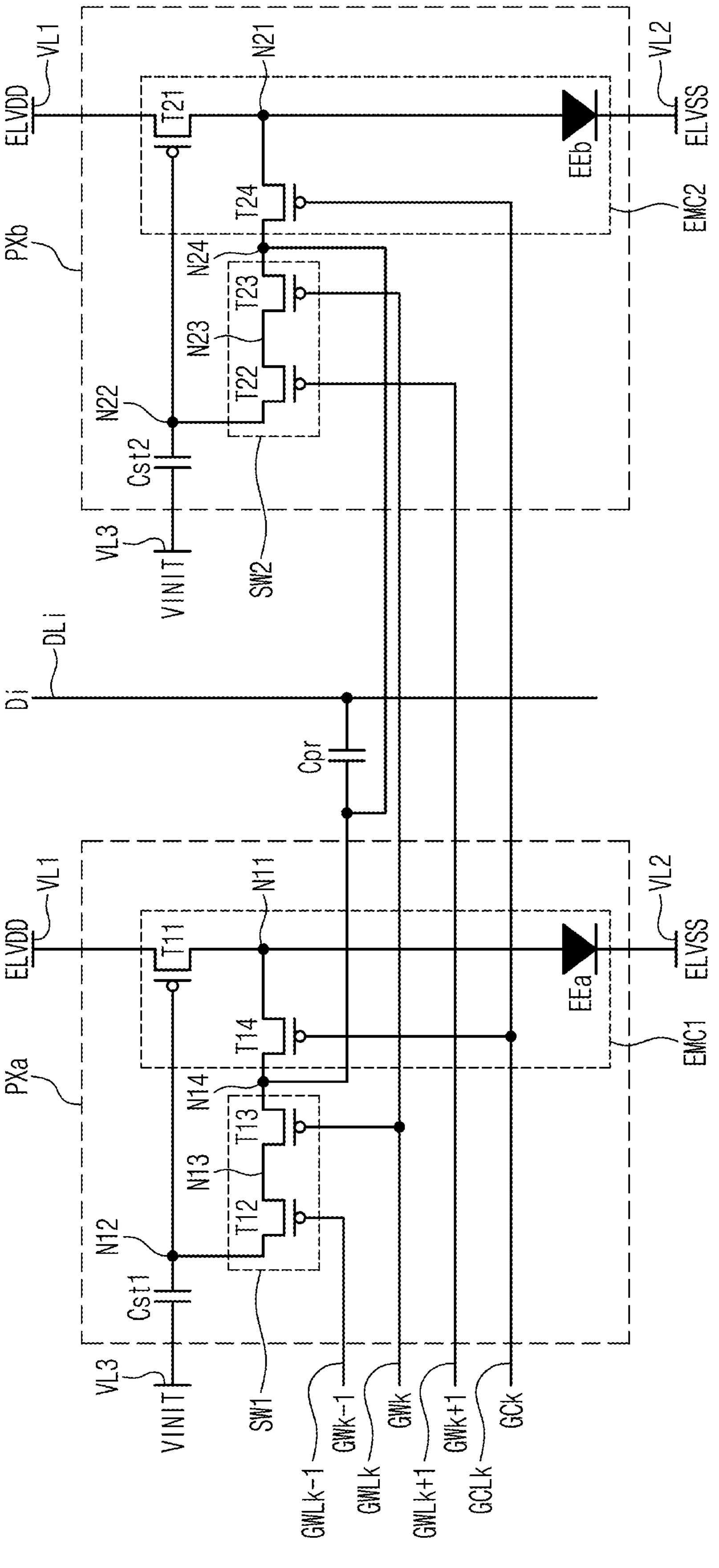
FIG. 2 is a circuit diagram of a first pixel and a second pixel, according to an embodiment of the present disclosure.

FIG. 2 is a circuit diagram of the first pixel PXa and the second pixel PXb, according to an embodiment of the present disclosure.

FIG. 2 shows the first pixel PXa and the second pixel PXb disposed in a k-th row among the first pixels PXa and the second pixels PXb illustrated in FIG. 1.

The first pixel PXa and the second pixel PXb are connected in common to the i-th data line DLi among the data lines DL1 to DLm illustrated in FIG. 1. The first pixel PXa is connected to scan lines GWLk−1, GWLk, and GCLk. The second pixel PXb is connected to scan lines GWLk, GWLk+1, and GCLk. For example, the first pixel PXa is connected to a previous scan line, a current scan line, and a common scan line; and the second pixel PXb is connected to the current scan line, a next scan line, and the common scan line.

The first pixel PXa includes eleventh to fourteenth transistors T11, T12, T13, and T14, a capacitor Cst1, and at least one light emitting element EEa. While FIG. 2 illustrates that the first pixel PXa includes a single light emitting element EEa, the present disclosure is not limited thereto.

In an embodiment, each of the eleventh to fourteenth transistors T11, T12, T13, and T14 is a P-type transistor having a low-temperature polycrystalline silicon (LTPS) semiconductor layer, but is not limited thereto. Each of the eleventh to fourteenth transistors T11, T12, T13, and T14 may be an N-type transistor by using an oxide semiconductor as a semiconductor layer. In an embodiment, at least one of the eleventh to fourteenth transistors T11, T12, T13, and T14 may be an N-type transistor, and the other(s) thereof may be P-type transistors.

In an embodiment, the eleventh transistor T11, the fourteenth transistor T14, and the light emitting element EEa may constitute a first emission circuit EMC1. In an embodiment, the twelfth transistor T12 and the thirteenth transistor T13 may constitute a first switching circuit SW1.

The second pixel PXb includes 21st to 24th transistors T21, T22, T23, and T24, a capacitor Cst2, and at least one light emitting element EEb. While FIG. 2 illustrates that the second pixel PXb includes a single light emitting element EEb, the present disclosure is not limited thereto.

In an embodiment, each of the 21st to 24th transistors T21 to T24 is a P-type transistor having a low-temperature polycrystalline silicon (LTPS) semiconductor layer, but is not limited thereto. Each of the 21st to 24th transistors T21 to T24 may be an N-type transistor by using an oxide semiconductor as a semiconductor layer. In an embodiment, at least one of the 21st to 24th transistors T21 to T24 may be an N-type transistor, and the other(s) thereof may be P-type transistors.

In an embodiment, the 21st transistor T21, the 24th transistor T24, and the light emitting element EEb may constitute a second emission circuit EMC2. In an embodiment, the 22nd transistor T22 and the 23rd transistor T23 may constitute a second switching circuit SW2.

However, the circuit configuration of the first pixel PXa and the second pixel PXb according to an embodiment of the present disclosure is not limited to the embodiment shown in FIG. 2.

Referring to FIG. 2, the scan lines GWLk−1, GWLk, GWLk+1, and GCLk may deliver the scan signals GWk−1, GWk, GWk+1, and GCk, respectively. The data line DLi delivers a data signal Di. The data signal Di may have a voltage level corresponding to the image signal RGB input to the electronic device ED (see FIG. 1). First, second, and third voltage lines VL1, VL2, and VL3 may deliver the first voltage ELVDD, the second voltage ELVSS and the third voltage VINIT, respectively.

The eleventh to fourteenth transistors T11, T12, T13, and T14, the capacitor Cst1, and the light emitting element EEa in the first pixel PXa may be connected as follows.

The eleventh transistor T11 is connected between the first voltage line VL1 and an eleventh node N11 and includes a gate electrode connected to a twelfth node N12.

The twelfth transistor T12 is connected between the twelfth node N12 and a thirteenth node N13 and includes a gate electrode connected to the scan line GWLk−1.

The thirteenth transistor T13 is connected between the thirteenth node N13 and a fourteenth node N14, and includes a gate electrode connected to the scan line GWLk.

The fourteenth transistor T14 is connected between the fourteenth node N14 and the eleventh node N11 and includes a gate electrode connected to the scan line GCLk.

The capacitor Cst1 is connected between the third voltage line VL3 and the twelfth node N12.

The light emitting element EEa is connected between the eleventh node N11 and the second voltage line VL2.

The 21st to 24th transistors T21, T22, T23, and T24, the capacitor Cst2, and the light emitting element EEb in the second pixel PXb may be connected as follows.

The 21st transistor T21 is connected between the first voltage line VL1 and a 21st node N21, and includes a gate electrode connected to a 22nd node N22.

The 22nd transistor T22 is connected between the 22nd node N22 and a 23rd node N23, and includes a gate electrode connected to the scan line GWLk+1.

The 23rd transistor T23 is connected between the 23rd node N23 and a 24th node N24, and includes a gate electrode connected to the scan line GWLk.

The 24th transistor T24 is connected between the 24th node N24 and the 21st node N21, and includes a gate electrode connected to the scan line GCLk.

The capacitor Cst2 is connected between the third voltage line VL3 and the 22nd node N22.

The light emitting element EEb is connected between the 21st node N21 and the second voltage line VL2.

In an embodiment, the display panel DP (see FIG. 1) may further include a capacitor Cpr connected between the data line DLi and the fourteenth node N14, and connected between the data line DLi and the 24th node N24. In another embodiment, the display panel DP does not include the capacitor Cpr. In this case, the fourteenth node N14 is directly connected to the data line DLi, and the 24th node N24 is directly connected to the data line DLi.

Figure 3:
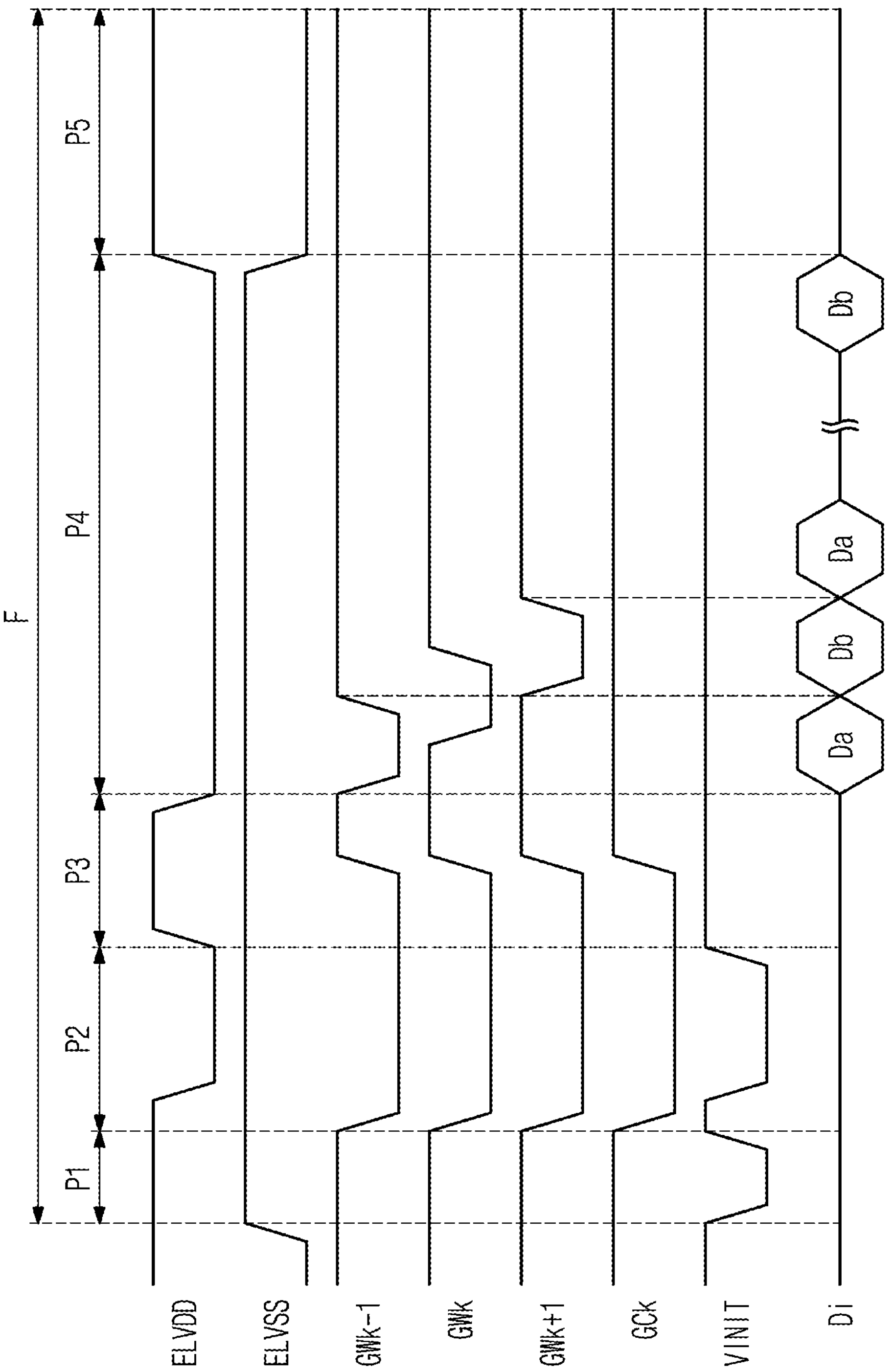
FIG. 3 is a timing diagram for describing operations of a first pixel and a second pixel shown in FIG. 2, according to an embodiment of the present disclosure.

FIG. 3 is a timing diagram for describing operations of the first pixel PXa and the second pixel PXb shown in FIG. 2, according to an embodiment of the disclosure.

The second pixel PXb illustrated in FIG. 2 includes a circuit configuration similar to that of the first pixel PXa. Accordingly, in the following description, only the operation of the first pixel PXa is described, and the description of the operation of the second pixel PXb may be omitted.

Referring to FIGS. 2 and 3, one frame F (or frame period) may include first to fifth periods P1, P2, P3, P4, and P5. In the first period P1, both the first voltage ELVDD and the second voltage ELVSS are high voltages. Moreover, in the first period P1, all of the first scan signals GWk−1, GWk, and GWk+1 and the second scan signal GCk are at first logic levels (e.g., high levels). These first logic levels may deactivate the corresponding pixels.

All of the first scan signals GWk−1, GWk, and GWk+1 and the second scan signal GCk are at high levels, and thus the twelfth, thirteenth, and fourteenth transistors T12, T13, and T14 are turned off.

In the first period P1, the third voltage VINIT is a low voltage, and thus the low voltage is delivered to a gate electrode of the eleventh transistor T11 through the capacitor Cst1. The first period P1 may be an on-bias period for providing the third voltage VINIT having a turn-on level to the gate electrode of the eleventh transistor T11.

In the second period P2, the first voltage ELVDD and the third voltage VINIT are low voltages, and the second voltage ELVSS is a high voltage. In an embodiment, the second P2 period is distinct from the first period P1, and is immediately after and adjacent the first period P1.

Moreover, in the second period P2, all of the first scan signals GWk−1, GWk, and GWk+1 and the second scan signal GCk are at first logic levels (e.g., low levels). These second logic levels may deactivate the corresponding pixels. All of the first scan signals GWk−1, GWk, and GWk+1 and the second scan signal GCk are at low levels, and thus all of the twelfth, thirteenth, and fourteenth transistors T12, T13, and T14 are turned on. In the first period P1, the third voltage VINIT is a low voltage, and thus the eleventh transistor T11 may be turned on. In this case, the twelfth, thirteenth, and fourteenth transistors T12, T13, and T14 are turned on, and thus the gate electrode and the drain electrode (i.e., the eleventh node N11) of the eleventh transistor T11 are diode-connected. The second period P2 may be an initialization period.

In the third period P3, all of the first voltage ELVDD, the second voltage ELVSS, and the third voltage VINIT are high voltages. As the first voltage ELVDD changes to a high voltage while the first scan signals GWk−1, GWk, and GWk+1 and the second scan signal GCk are maintained at low levels, a voltage corresponding to the sum of the first voltage ELVDD and the threshold voltage of the eleventh transistor T11 may be stored in the capacitor Cst1. The third period P3 may be a compensation period for compensating for the threshold voltage of the eleventh transistor T11.

When both the first scan signals GWk−1 and GWk are at low levels in the fourth period P4, the twelfth and thirteenth transistors T12 and T13 in the first pixel PXa are turned on. The data signal Di, which is delivered through the data line DLi, is delivered to the capacitor Cst1 through the twelfth and thirteenth transistors T12 and T13. In this case, the data signal Di delivered to the data line DLi may be a data signal Da provided to the first pixels PXa of the k-th row.

When both the first scan signals GWk and GWk+1 are at low levels in the fourth period P4, the 22nd and 23rd transistors T22 and T23 in the second pixel PXb are turned on. In this case, the data signal Di delivered to the data line DLi is delivered to the capacitor Cst2 through the 22nd and 23rd transistors T22 and T23. In this case, the data signal Di delivered to the data line DLi may be a data signal Db provided to the second pixels PXb of the k-th row. The fourth period P4 may be a write period for storing the data signal Di in the capacitors Cst1 and Cst2.

In the fifth period P5, the first voltage ELVDD and the third voltage VINIT are high voltages, and the second voltage ELVSS is a low voltage. All of the first scan signals GWk−1, GWk, and GWk+1 and the second scan signal GCk are maintained at the first logic level (e.g., the high levels).

As the first voltage ELVDD changes to a high voltage and the second voltage ELVSS changes to a low voltage, a current corresponding to the data signal Da stored in the capacitor Cst1 flows into the light emitting element EEa, and a current corresponding to the data signal Db stored in the capacitor Cst2 flows into the light emitting element EEb. As a result, the light emitting elements EEa and EEb emit light. The fifth period P5 may be an emission period.

Figure 4:
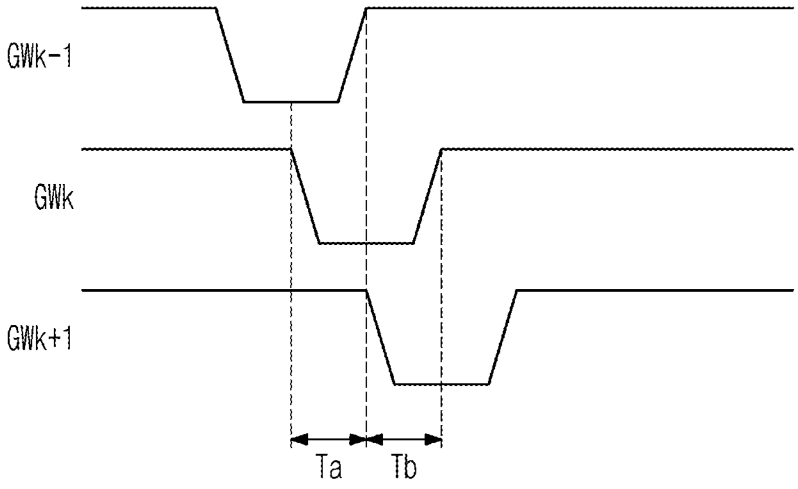
FIG. 4 is a timing diagram of first scan signals.

FIG. 4 is a timing diagram of the first scan signals GWk−1, GWk, and GWk+1.

Referring to FIGS. 2 and 4, when the twelfth and thirteenth transistors T12 and T13 of the first pixel PXa and the 22nd and 23rd transistors T22 and T23 of the second pixel PXb are P-type transistors, each of the first scan signals GWk−1, GWk, and GWk+1 is at a low level in an active period.

A first period Ta in the active period of the first scan signal GWk overlaps an active period of the first scan signal GWk−1. For example, the first period Ta occurs when the active period of the current scan signal overlaps with the active period of the previous scan signal. In other words, when the first scan signal GWk and the first scan signal GWk−1 are at low levels at the same time, the twelfth and thirteenth transistors T12 and T13 of the first pixel PXa are turned on at the same time. As a result, the data signal Di delivered to the data line DLi may be stored in the capacitor Cst1 of the first pixel PXa.

A second period Tb in an active period of the first scan signal GWk overlaps an active period of the first scan signal GWk+1. For example, the second period Tb occurs when the active period of the current scan signal overlaps with the active period of the next scan signal. In other words, when the first scan signal GWk and the first scan signal GWk+1 are at low levels at the same time, the 22nd and 23rd transistors T22 and T23 of the second pixel PXb are turned on at the same time. As a result, the data signal Di delivered to the data line DLi may be stored in the capacitor Cst2 of the second pixel PXb.

The first pixel PXa and the second pixel PXb share one data line DLi, but there is no need for a separate signal for selecting the first pixel PXa and the second pixel PXb. As a result, the area size of the non-display area NDA within the display panel DP (see FIG. 1) may be minimized. Moreover, no separate circuit is required to select the first pixel PXa and the second pixel PXb, and thus the power consumption of the electronic device may be minimized. Moreover, as the first pixel PXa and the second pixel PXb share one data line DLi, the resolution of the display panel DP may increase.

Figure 5:
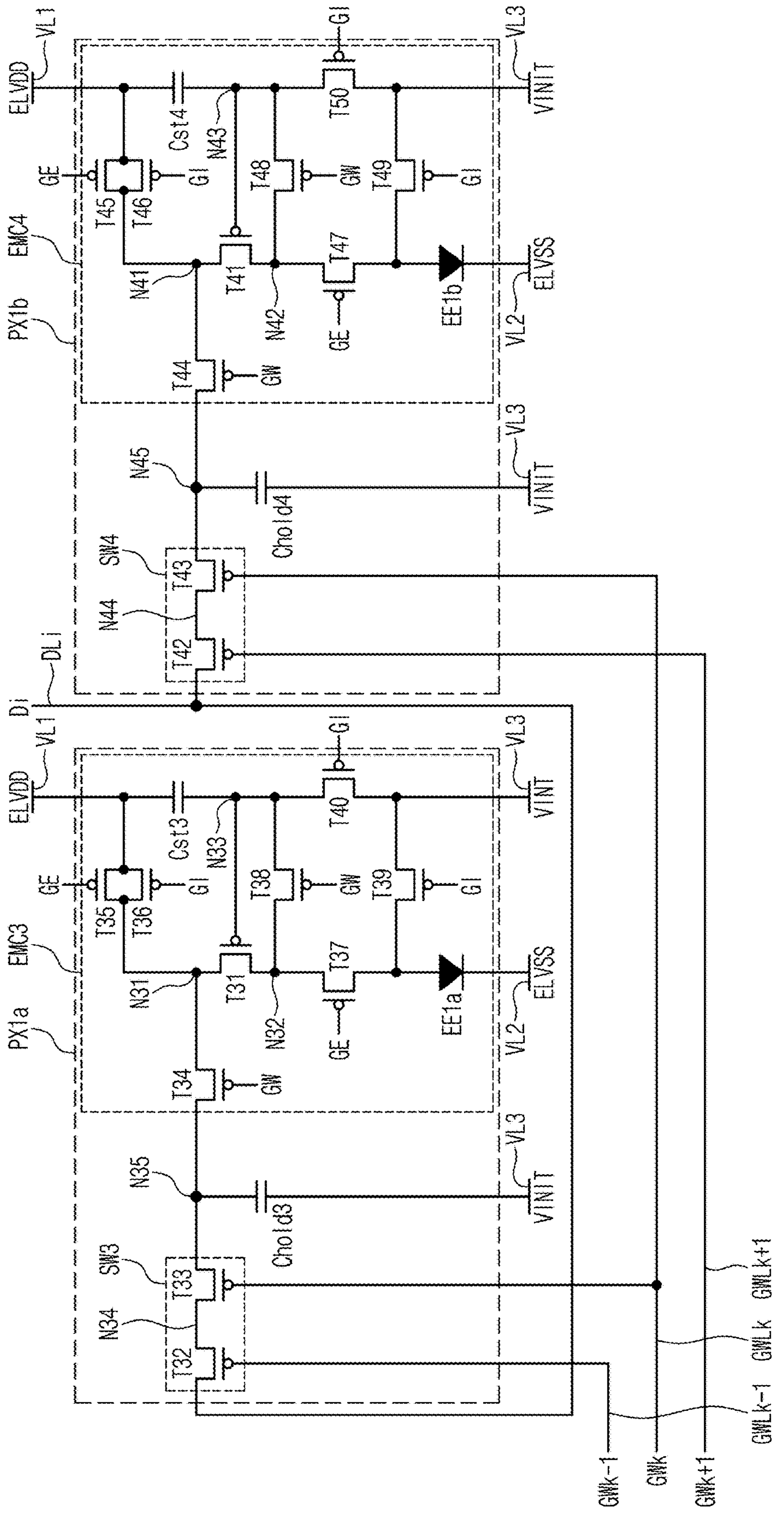
FIG. 5 is a circuit diagram of a first pixel and a second pixel, according to an embodiment of the present disclosure.

FIG. 5 is a circuit diagram of a first pixel PX1*a* and a second pixel PX1*b*, according to an embodiment of the present disclosure.

FIG. 5 shows the first pixel PX1*a* and the second pixel PX1*b* disposed in the k-th row (e.g., a current row). In an embodiment, the first pixel PX1*a* is located directly adjacent to the second pixel PX1*b* in the same row.

The first pixel PX1*a* and the second pixel PX1*b* are connected in common to the i-th data line DLi among a plurality of data lines. The first pixel PX1*a* is connected to the scan lines GWLk−1 and GWLk. The second pixel PX1*b* is connected to the scan lines GWLk and GWLk+1. The first pixel PX1*a* and the second pixel PX1*b* may receive common scan signals GE, GI, and GW.

The common scan signals GE, GI, and GW are signals provided in common to all the first pixels PX1*a* and all the second pixels PX1*b*, which are disposed in the display panel. The common scan signals GE, GI, and GW may be updated at each frame F (see FIG. 6).

The scan signal GWk−1 corresponds to the first pixel PX1*a* and the second pixel PX1*b* of the (k−1)-th row (e.g., a previous row) of the display panel; the scan signal GWk corresponds to the first pixel PX1*a* and the second pixel PX1*b* of the k-th row of the display panel; and, the scan signal GWk+1 corresponds to the first pixel PX1*a* and the second pixel PX1*b* of the (k+1)-th row (e.g., a next row) of the display panel.

The first pixel PX1*a* includes 31st to 40th transistors T31 to T40, capacitors Cst3 and Chold3, and a light emitting element EE1*a*. For example, compared to pixel PXa, PX1*a* may have more transistors and be controlled by additional common scan signals.

In an embodiment, each of the 31st to 40th transistors T31 to T40 is a P-type transistor having an LTPS semiconductor layer, but is not limited thereto. Each of the 31st to 40th transistors T31 to T40 may be an N-type transistor by using an oxide semiconductor as a semiconductor layer. In an embodiment, at least one of the 31st to 40th transistors T31 to T40 may be an N-type transistor, and the other(s) thereof may be P-type transistors.

In an embodiment, the 31st, and 34th to 40th transistors T31 and T34 to T40 and the light emitting element EE1*a* may constitute a first emission circuit EMC3. In an embodiment, the 32nd transistor T32 and the 34th transistor T34 may constitute a first switching circuit SW3.

The second pixel PX1*b* includes 41st to 50th transistors T41 to T50, capacitors Cst4 and Chold4, and a light emitting element EE1*b*.

In an embodiment, each of the 41st to 50th transistors T41 to T50 is a P-type transistor having an LTPS semiconductor layer, but is not limited thereto. Each of the 41st to 50th transistors T41 to T50 may be an N-type transistor by using an oxide semiconductor as a semiconductor layer. In an embodiment, at least one of the 41st to 50th transistors T41 to T50 may be an N-type transistor, and the other(s) thereof may be P-type transistors.

In an embodiment, the 41st and 44th to 50th transistors T41 and T44 to T50 and the light emitting element EEb may constitute a second emission circuit EMC4. In an embodiment, the 42nd transistor T42 and the 43rd transistor T43 may constitute a second switching circuit SW4.

In addition, the circuit configuration of the first pixel PX1*a* and the second pixel PX1*b* according to an embodiment of the present disclosure is not limited to the embodiment in FIG. 5.

Referring to FIG. 5, the scan lines GWLk−1, GWLk, GWLk+1, and GCLk may deliver the scan signals GWk−1, GWk, GWk+1, and GCk, respectively. The data line DLi delivers the data signal Di. The data signal Di may have a voltage level corresponding to the image signal RGB input to the electronic device ED (see FIG. 1). The first, second, and third voltage lines VL1, VL2, and VL3 may deliver the first voltage ELVDD, the second voltage ELVSS and the third voltage VINIT, respectively.

The 31st to 40th transistors T31 to T40, the capacitors Cst3 and Chold3, and the light emitting element EE1*a* in the first pixel PX1*a* may be connected as follows.

The 31st transistor T31 is connected between a 31st node N31 and a 32nd node N32, and includes a gate electrode connected to a 33rd node N33.

The 32nd transistor T32 is connected between the data line DLi and a 34th node N34, and includes a gate electrode connected to the scan line GWLk−1.

The 33rd transistor T33 is connected between the 34th node N34 and a 35th node N35, and includes a gate electrode connected to the scan line GWLk.

The 34th transistor T34 is connected between the 35th node N35 and the 31st node N31 and includes a gate electrode that receives the common scan signal GW.

The 35th transistor T35 is connected between the 31st node N31 and the first voltage line VL1, and includes a gate electrode that receives the common scan signal GE.

The 36th transistor T36 is connected between the 31st node N31 and the first voltage line VL1, and includes a gate electrode that receives the common scan signal GI.

The 37th transistor T37 is connected between the 32nd node N32 and the anode of the light emitting element EE1*a*, and includes a gate electrode that receives the common scan signal GE.

The 38th transistor T38 is connected between the 32nd node N32 and the 33rd node N33, and includes a gate electrode that receives the common scan signal GW.

The 39th transistor T39 is connected between the anode of the light emitting element EE1*a* and the third voltage line VL3, and includes a gate electrode that receives the common scan signal GI.

The 40th transistor T40 is connected between the 33rd node N33 and the third voltage line VL3, and includes a gate electrode that receives the common scan signal GI.

The capacitor Cst3 is connected between the first voltage line VL1 and the 33rd node N33.

The capacitor Chold3 is connected between the 35th node N35 and the third voltage line VL3.

The light emitting element EE1*a* includes the anode and a cathode connected to the second voltage line VL2.

The 41st to 50th transistors T41 to T40, the capacitor Cst4, and the light emitting element EE1*b* in the second pixel PX1*b* may be connected as follows.

The 41st transistor T41 is connected between a 41st node N41 and a 42nd node N42, and includes a gate electrode connected to a 43rd node N43.

The 42nd transistor T42 is connected between the data line DLi and a 44th node N44, and has a gate electrode connected to the scan line GWLk+1.

The 43rd transistor T43 is connected between the 44th node N44 and a 45th node N45, and includes a gate electrode connected to the scan line GWLk.

The 44th transistor T44 is connected between the 45th node N45 and the 41st node N41 and includes a gate electrode that receives the common scan signal GW.

The 45th transistor T45 is connected between the 41st node N41 and the first voltage line VL1, and includes a gate electrode that receives the common scan signal GE.

The 46th transistor T46 is connected between the 41st node N41 and the first voltage line VL1, and includes a gate electrode that receives the common scan signal GI.

The 47th transistor T47 is connected between the 42nd node N42 and an anode of the light emitting element EE1*b*, and includes a gate electrode that receives the common scan signal GE.

The 48th transistor T48 is connected between the 42nd node N42 and the 43rd node N43 and includes a gate electrode that receives the common scan signal GW.

The 49th transistor T49 is connected between the anode of the light emitting element EE1*b* and the third voltage line VL3, and includes a gate electrode that receives the common scan signal GI.

The 50th transistor T50 is connected between the 43rd node N43 and the third voltage line VL3, and includes a gate electrode that receives the common scan signal GI.

The capacitor Cst4 is connected between the first voltage line VL1 and the 43rd node N43.

The capacitor Chold4 is connected between the 45th node N45 and the third voltage line VL3.

The light emitting element EE1*b* includes the anode and a cathode connected to the second voltage line VL2.

Figure 6:
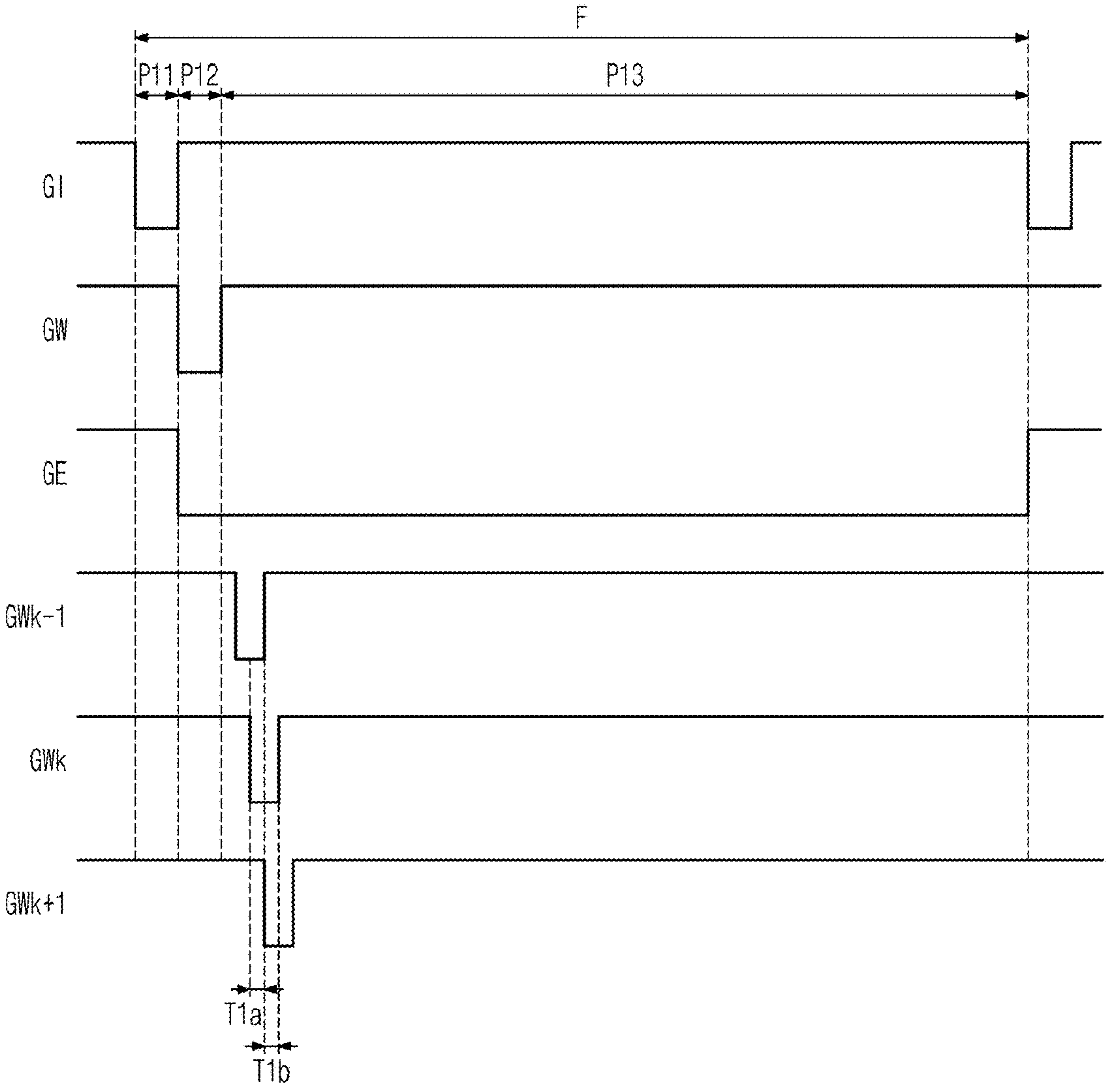
FIG. 6 is a timing diagram for describing operations of a first pixel and a second pixel shown in FIG. 5, according to an embodiment of the present disclosure.

FIG. 6 is a timing diagram for describing operations of the first pixel PX1*a* and the second pixel PX1*b* shown in FIG. 5, according to an embodiment of the disclosure.

The second pixel PX1*b* illustrated in FIG. 5 includes a circuit configuration similar to that of the first pixel PX1*a*. Accordingly, in the following description, only the operation of the first pixel PX1*a* is described, and the description of the operation of the second pixel PX1*b* may be omitted.

Referring to FIGS. 5 and 6, one frame F (or frame period) may include eleventh, twelfth, and thirteenth periods P11, P12, and P13. When the common scan signal GI is at a low level in the eleventh period P11, the 36th, 39th, and 40th transistors are turned on. Accordingly, the first voltage ELVDD is provided to the first electrode (i.e., the 31st node N31) of the 31st transistor T31 and one end of the capacitor Cst3, and the third voltage VINIT is provided to the anode of the light emitting element EE1*a*, the gate electrode of the 31st transistor T31, and the other end of the capacitor Cst3. In other words, the eleventh period P11 may be an initialization period.

When the common scan signals GW and GE are at low levels in the twelfth period P12, the 34th, 35th, 37th, and 38th transistors T34, T35, T37, and T38 are turned on. The voltage of the previous frame stored in the capacitor Chold may be stored in the capacitor Cst3 through the 34th transistor T34 and 35th transistor T35 that are turned on. In this case, the 38th transistor T38 is turned on, and thus the gate electrode and second electrode of the 31st transistor T31 are diode-connected. While the 31st transistor T31 is diode-connected, the voltage stored in the capacitor Cst3 corresponds to a difference between the voltage stored in the capacitor Chold and a threshold voltage of the 31st transistor T31. That is, the twelfth period P12 may be a compensation period for compensating for the threshold voltage of the 31st transistor T31.

In the thirteenth period P13, the common scan signal GE is maintained at a low level. In this case, as the first scan signals GWk−1, GWk, and GWk+1 sequentially transition to low levels, the data signal Di provided to the data line DLi may be stored in the capacitors Chold3 and Chold4.

That is, the thirteenth period P13 may be both an emission and write period. For example, part of the thirteenth period P13 may be the emission period and another part of the thirteenth period P13 may be the write period.

A first period T1*a* in the active period of the first scan signal GWk overlaps an active period of the first scan signal GWk−1. In other words, when the first scan signal GWk and the first scan signal GWk−1 are at low levels at the same time, the 32nd and 33rd transistors T32 and T33 of the first pixel PX1*a* are turned on at the same time. As a result, the data signal Di delivered to the data line DLi may be stored in the capacitor Chold3 of the first pixel PX1*a*.

A second period T1*b* in an active period of the first scan signal GWk overlaps an active period of the first scan signal GWk+1. In other words, when the first scan signal GWk and the first scan signal GWk+1 are at low levels at the same time, the 42nd and 43rd transistors T42 and T43 of the second pixel PX1*b* are turned on at the same time. As a result, the data signal Di delivered to the data line DLi may be stored in the capacitor Chold4 of the second pixel PX1*b*. The voltages stored in the capacitors Chold3 and Chold4 may be stored in the capacitors Cst3 and Cst4 in the next frame (or next frame period).

The first pixel PX1*a* and the second pixel PX1*b* share one data line DLi, but there is no need for a separate signal for selecting the first pixel PX1*a* and the second pixel PX1*b*. For example, PX1*a* and PX1*b* do not require an additional selection signal beyond their assigned first scan signals GWLk−1, GWLk, and GWLk+1, as their activation is naturally determined by the overlap of these signals. The first pixel PX1*a* and the second pixel PX1*b* share the same data line DLi but receive different first scan signals, with PX1*a* operating in response to the first scan signals GWLk−1 and GWLk, and PX1*b* operating in response to the first scan signals GWLk and GWLk+1. Both PX1*a* and PX1*b* receive the same common second scan signal GCLk. The activation periods of PX1*a* and PX1*b* are staggered due to the overlapping nature of the first scan signals, eliminating the need for an additional selection signal. As a result, the area size of the non-display area NDA within the display panel DP (see FIG. 1) may be minimized. Moreover, no separate circuit is required to select the first pixel PX1*a* and the second pixel PX1*b*, and thus the power consumption of the electronic device may be minimized. For example, PX1*a* is selected when GWLk−1 and GWLk overlap; PX1*b* is selected when GWLk and GWLk+1 overlap; and since the timing of the scan signals naturally differentiates the pixels, a separate circuit to manually switch between PX1*a* and PX1*b* is unnecessary. Moreover, as the first pixel PX1*a* and the second pixel PX1*b* share one data line DLi, the resolution of the display panel DP may increase.

Figure 7:
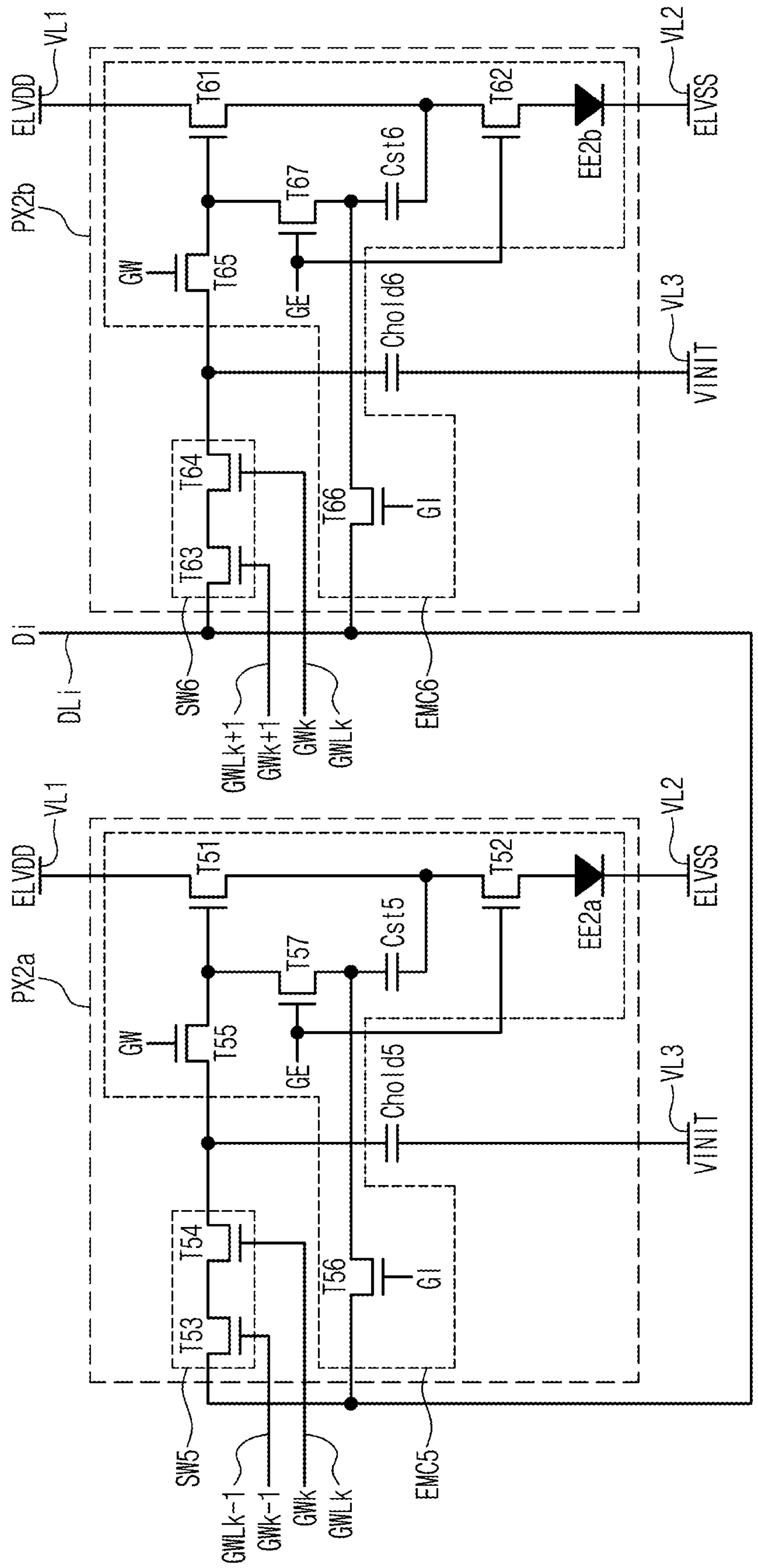
FIG. 7 is a circuit diagram of a first pixel and a second pixel, according to an embodiment of the present disclosure.

FIG. 7 is a circuit diagram of a first pixel PX2*a* and a second pixel PX2*b*, according to an embodiment of the present disclosure.

FIG. 7 shows the first pixel PX2*a* and the second pixel PX2*b* disposed in the k-th row. In an embodiment, the first pixel PX2*a* is disposed directly adjacent to the second pixel PX2*b* in the same row. As compared to PXa and PXb, the first pixel PX2*a* and the second pixel PX2*b* have more transistors (e.g., a 7-transistor circuit as compared to a 4-transistor circuit), includes more capacitors, and receives additional common scan signals. As compared to PX1*a* and PX1*b*, the first pixel PX2*a* and the second pixel PX2*b* have less transistors (e.g., a 7-transistor circuit as compared to a 10-transistor circuit), fewer transistors in the emission circuit, and a simpler switching circuit.

The first pixel PX2*a* and the second pixel PX2*b* are connected in common to the i-th data line DLi among a plurality of data lines. The first pixel PX2*a* is connected to the scan lines GWLk−1 and GWLk. The second pixel PX2*b* is connected to the scan lines GWLk and GWLk+1. The first pixel PX2*a* and the second pixel PX2*b* may receive common scan signals GE, GI, and GW.

The first pixel PX2*a* includes 51st to 57th transistors T51 to T57, capacitors Cst5 and Chold5, and a light emitting element EE2*a*.

In an embodiment, each of the 51st to 57th transistors T51 to T57 is an N-type transistor by using an oxide semiconductor as a semiconductor layer. However, the present disclosure is not limited thereto. Each of the 51st to 57th transistors T51 to T57 may be a P-type transistor having an LTPS semiconductor layer. In an embodiment, at least one of the 51st to 57th transistors T51 to T57 may be an N-type transistor, and the other(s) thereof may be P-type transistors.

In an embodiment, the 51st, 52nd, 55th, 56th, and 57th transistors T51, T52, T55, T56, and T57 and the light emitting element EE2*a* may constitute a first emission circuit EMC5. In an embodiment, the 53rd transistor T53 and the 54th transistor T54 may constitute a first switching circuit SW5.

The second pixel PX2*b* includes 61st to 67th transistors T61 to T67, capacitors Cst6 and Chold6, and a light emitting element EE2*b*.

In an embodiment, each of the 61st to 67th transistors T61 to T67 is an N-type transistor by using an oxide semiconductor as a semiconductor layer, but is not limited thereto. Each of the 61st to 67th transistors T61 to T67 may be a P-type transistor having an LTPS semiconductor layer. In an embodiment, at least one of the 61st to 67th transistors T61 to T67 may be an N-type transistor, and the other(s) thereof may be P-type transistors.

In an embodiment, the 61st, 62nd, 65th, 66th, and 67th transistors T61, T62, T65, T66, and T67 and the light emitting element EE2*b* may constitute a second emission circuit EMC6. In an embodiment, the 63rd transistor T63 and the 64th transistor T64 may constitute a second switching circuit SW6.

In addition, the circuit configuration of the first pixel PX2*a* and the second pixel PX2*b* according to an embodiment of the present disclosure is not limited to the embodiment in FIG. 7.

When the first scan signal GWk−1 and the first scan signal GWk are at high levels at the same time, the 53rd and 54th transistors T53 and T54 of the first pixel PX2*a* are turned on at the same time. As a result, the data signal Di delivered to the data line DLi may be stored in the capacitor Chold5 of the first pixel PX2*a*.

When the first scan signal GWk and the first scan signal GWk+1 are at high levels at the same time, the 63rd and 64th transistors T63 and T64 of the second pixel PX2*b* are turned on at the same time. As a result, the data signal Di delivered to the data line DLi may be stored in the capacitor Chold6 of the second pixel PX2*b*. The voltages stored in the capacitors Chold5 and Chold6 may be stored in the capacitors Cst5 and Cst6 in the next frame (or next frame period).

The first pixel PX2*a* and the second pixel PX2*b* share one data line DLi, but there is no need for a separate signal for selecting the first pixel PX2*a* and the second pixel PX2*b*. For example, the first pixel PX2*a* and the second pixel PX2*b* share one data line DLi and do not require an additional selection signal beyond their assigned first scan signals (GWLk−1, GWLk, and GWLk+1), as their activation is determined by the overlap of these signals. As a result, the area size of the non-display area NDA within the display panel DP (see FIG. 1) may be minimized. Moreover, no separate circuit is required to select the first pixel PX2*a* and the second pixel PX2*b*, and thus the power consumption of the electronic device may be minimized. Moreover, as the first pixel PX2*a* and the second pixel PX2*b* share one data line DLi, the resolution of the display panel DP may increase.

Figure 8:
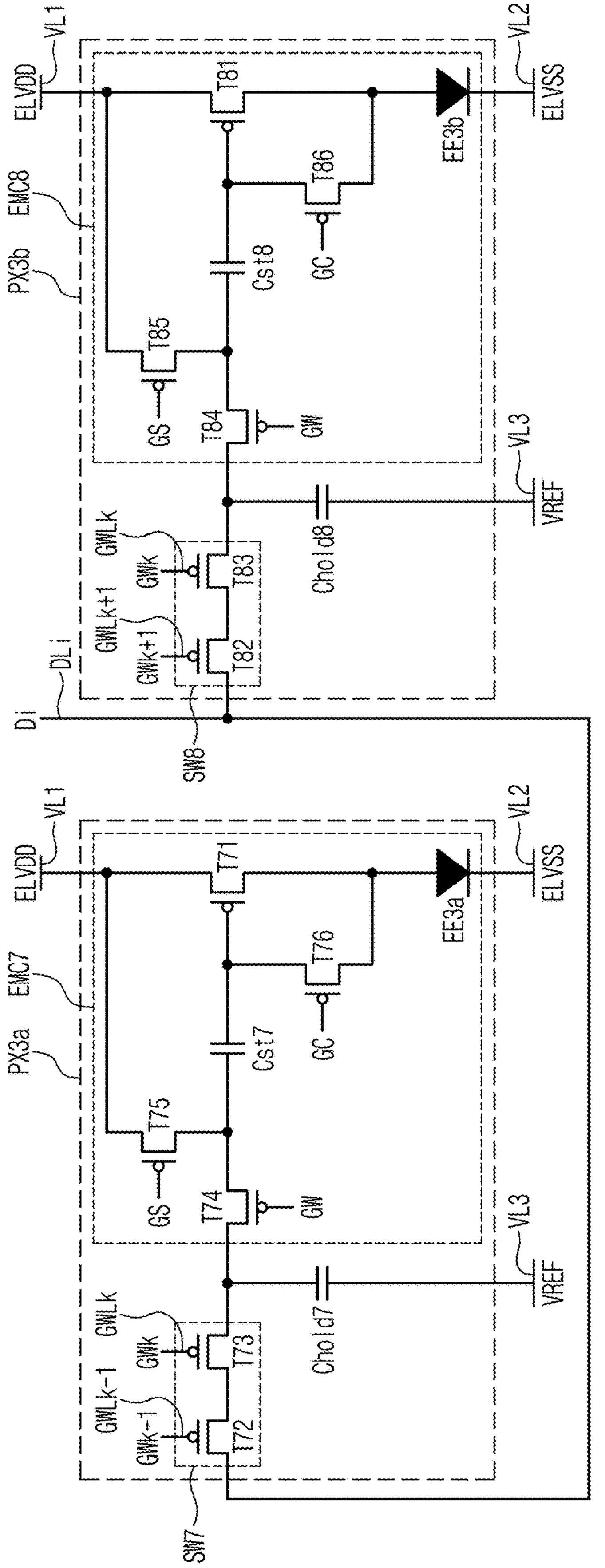
FIG. 8 is a circuit diagram of a first pixel and a second pixel, according to an embodiment of the present disclosure.

FIG. 8 is a circuit diagram of a first pixel PX3*a* and a second pixel PX3*b*, according to an embodiment of the present disclosure.

FIG. 8 shows the first pixel PX3*a* and the second pixel PX3*b* disposed in the k-th row. In an embodiment, the first pixel PX3*a* is directly adjacent to the second pixel PX3*b* in the same row. As compared to PXa and PXb, the first pixel PX3*a* and the second pixel PX3*b* have more transistors (e.g., a 6-transistor circuit as compared to a 4-transistor circuit), include additional capacitors, and utilize a more complex emission circuit with different common scan signals. As compared to PX1*a* and PX1*b*, the third pixel PX3*a* and the second pixel PX3*b* have fewer transistors (e.g., a 6-transistor circuit as compared to a 10-transistor circuit), a simplified circuit structure, and a different set of common scan signals. As compared to PX2*a* and PX2*b*, the first pixel PX3*a* and the second pixel PX3*b* have one fewer transistor per pixel (6 vs. 7) and use a different configuration of common scan signals.

The first pixel PX3*a* and the second pixel PX3*b* are connected in common to the i-th data line DLi among a plurality of data lines. The first pixel PX3*a* is connected to the scan lines GWLk−1 and GWLk. The second pixel PX3*b* is connected to the scan lines GWLk and GWLk+1. The first pixel PX3*a* and the second pixel PX3*b* may receive common scan signals GC, GS, and GW.

The first pixel PX3*a* includes 71st to 76th transistors T71 to T76, capacitors Cst7 and Chold7, and a light emitting element EE3*a*.

In an embodiment, each of the 71st to 76th transistors T71 to T76 is a P-type transistor having an LTPS semiconductor layer, but the present disclosure is not limited thereto. Each of the 71st to 76th transistors T71 to T76 may be an N-type transistor by using an oxide semiconductor as a semiconductor layer. In an embodiment, at least one of the 71st to 76th transistors T61 to T67 may be an N-type transistor, and the other(s) thereof may be P-type transistors.

In an embodiment, the 71st, 74th, 75th, and 76th transistors T71, T74, T75, and T76 and the light emitting element EE3*a* may constitute a first emission circuit EMC7. In an embodiment, the 72nd transistor T72 and the 73rd transistor T73 may constitute a first switching circuit SW7.

The second pixel PX3*b* includes 81st to 86th transistors T81 to T86, capacitors Cst8 and Chold8, and a light emitting element EE3*b*.

In an embodiment, each of the 81st to 86th transistors T81 to T86 is a P-type transistor having an LTPS semiconductor layer, but the present disclosure is not limited thereto. Each of the 81st to 86th transistors T81 to T86 may be an N-type transistor by using an oxide semiconductor as a semiconductor layer. In an embodiment, at least one of the 81st to 86th transistors T81 to T86 may be an N-type transistor, and the other(s) thereof may be P-type transistors.

In an embodiment, the 81st, 84th, 85th, and 86th transistors T81, T84, T85, and T86 and the light emitting element EE3*b* may constitute a second emission circuit EMC8. In an embodiment, the 82nd transistor T82 and the 83rd transistor T83 may constitute a second switching circuit SW8.

In the example shown in FIG. 8, the third voltage line VL3 may deliver a reference voltage VREF.

In addition, the circuit configuration of the first pixel PX3*a* and the second pixel PX3*b* according to an embodiment of the present disclosure is not limited to the embodiment in FIG. 8.

When the first scan signal GWk−1 and the first scan signal GWk are at low levels at the same time, the 72nd and 73rd transistors T72 and T73 of the first pixel PX3*a* are turned on at the same time. As a result, the data signal Di delivered to the data line DLi may be stored in the capacitor Chold7 of the first pixel PX3*a*.

When the first scan signal GWk and the first scan signal GWk+1 are at low levels at the same time, the 82nd and 83rd transistors T82 and T83 of the second pixel PX3*b* are turned on at the same time. As a result, the data signal Di delivered to the data line DLi may be stored in the capacitor Chold8 of the second pixel PX3*b*. The voltages stored in the capacitors Chold7 and Chold8 may be stored in the capacitors Cst7 and Cst8 in the next frame (or next frame period).

The first pixel PX3*a* and the second pixel PX3*b* share one data line DLi, but there is no need for a separate signal for selecting the first pixel PX3*a* and the second pixel PX3*b*. For example, the first pixel PX3*a* and the second pixel PX3*b* share the same data line DLi, but their activation is determined by the overlap of their assigned first scan signals, eliminating the need for an additional selection signal. As a result, the area size of the non-display area NDA within the display panel DP (see FIG. 1) may be minimized. Moreover, no separate circuit is required to select the first pixel PX3*a* and the second pixel PX3*b*, and thus the power consumption of the electronic device may be minimized. Moreover, as the first pixel PX3*a* and the second pixel PX3*b* share one data line DLi, the resolution of the display panel DP may increase.

An electronic device having such the configuration may display an image while two pixels share one data line. Because no separate circuit is required to select a pixel even when two pixels share one data line, the area size of a non-display area within a display panel may be minimized. Moreover, no separate circuit is required to select a pixel, and thus the power consumption of the electronic device may be minimized.

Figure 9:
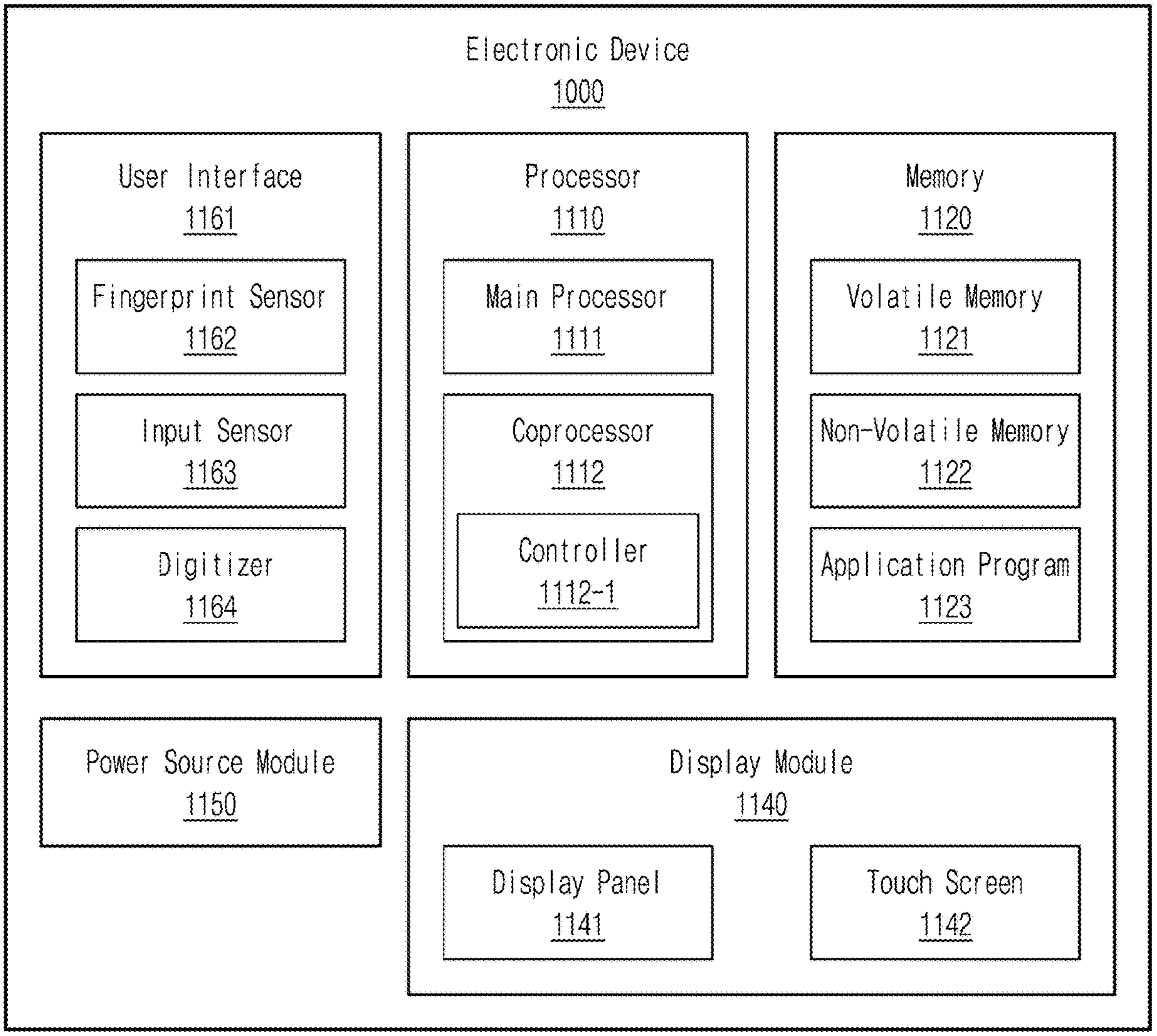
FIG. 9 is a block diagram of an electronic device, according to an embodiment of the present disclosure.

FIG. 9 is a diagram illustrating an electronic device according to an embodiment of the present invention. Referring to FIG. 9, the electronic device 1000 according to one embodiment of the present invention may output various information (e.g., images, text, music, etc.) through a display module 1140, which, for example, may correspond to the display device shown in FIG. 1. When a processor 1110 executes an application stored in a memory 1120, the display module 1140 may provide application information to a user through a display panel 1141.

In some embodiments, the electronic device 1000 may be configured as a smartphone, camera, smart TV, monitor, smartwatch, tablet, automotive display, or AR/VR headset. For example, the electronic device 1000 may be a smartphone including a touch-sensitive display area DA for interaction and a non-display area NDA including sensors and circuits for enhanced functionality. For example, the electronic device 1000 may be a television or monitor including a large display area DA for high-resolution video playback and a non-display area NDA incorporating driving circuits or connectivity modules for external inputs. For example, the electronic device 1000 may be a smartwatch including a display area DA optimized for compact and high-clarity visuals and a non-display area NDA integrating biometric sensors for health monitoring. In some cases, the electronic device 1000 may be an AR/VR headset.

In some embodiments, memory 1120 may store information such as software codes for operating an application program 1123. The application program 1123 may include software designed to execute specific tasks or provide functionality to a user. The application program 1123 may operate under the control of the processor 1110 and utilizes data stored in the memory 1120 to deliver a wide range of features, such as productivity tools, multimedia streaming and playback, file or mail deliveries or communication services. The application program 1123 interacts seamlessly with the user interface 1161 or touch screen 1142, allowing a user to launch, navigate, and utilize the program through user inputs such as touch, tap, gesture, or voice interaction.

Upon user selection of an application via touch screen 1142 or user interface 1161, the processor 1110 may execute the application program 1123 corresponding to the selected application retrieved from the memory 1120 to perform functionalities of the application. For example, when a user selects a camera application by tapping the icon (or a camera application icon) presented on the display panel 1141, the processor 1110 activates a camera module or the camera device. The processor 1110 may transmit image data corresponding to a captured image acquired through the camera module to the display module 1140. The display module 1140 may display an image corresponding to the captured image through the display panel 1141.

For example, the camera device may be configured to capture images of an alignment inspection area of the electronic device, where the alignment inspection area includes an alignment bump (e.g., ABP), an alignment pad (e.g., APD) bonded to the alignment bump, and an alignment polymer pattern (e.g., APP) that is spaced apart from the alignment pad; and the processor 1110 may be configured to: process the captured images to detect center positions of the alignment bump, the alignment pad, and the alignment polymer pattern; compare the detected center positions of the alignment bump and the alignment pad with the center position of the alignment polymer pattern; and determine presence of misalignment based on results of the compare.

As another example, when a user wishes to make a phone call, the user taps the telephone icon displayed on the display module 1140, the processor 1110 may execute a phone application program stored in the memory 1120. A telephone keypad may be presented on the display panel 1141 for the user to enter a phone number to call.

The memory 1120 may store instructions, that, when executed by the processor 1110, cause it to perform the above steps of processing, comparing, and determining misalignment.

As another example, the display module 1140 may be integrated into an electronic device 1000, such as a laptop computer, smart TV, or tablet. A user wishing to access a multimedia streaming application (e.g., to watch a music video or movie) can do so by tapping the corresponding icon. This action activates the application, allowing the user to view the streamed content.

The processor 1110 may include a main processor 1111 and an auxiliary or coprocessor 1112. The main processor 1111 may include a central processing unit (CPU). The main processor 1111 may further include one or more of a graphics processing unit (GPU), a communication processor (CP), and an image signal processor (ISP).

The coprocessor 1112 may include a controller 1112-1. The controller 1112-1 may include an interface conversion circuit and a timing control circuit. The controller 1112-1 may receive an image signal from the main processor 1111, convert the data format of the image signal to match the interface specifications with the display module 1140, and output image data. The controller 1112-1 may output various control signals to drive the display module 1140. For example, the controller 1112-1 may drive the display module 1140 to display the icon on the display screen suitable for selection by a user to cause execution of an application program 1123.

The memory 1120 may store one or more application programs 1123 and various data used by at least one component (for example, the processor 1110 or the user interface 1161) of the electronic device 1000 and input data or output data for commands related thereto. For example, a camera application program, a GPS application program, an augmented reality and virtual reality application program, and other application programs that can be executed by the processor 1110 upon selection of corresponding icons presented on the display screen (or display panel 1141) via the touch screen 1142 or user interface 1161 by the user. In addition, various setting data corresponding to user settings may be stored in the memory 1120. The memory 1120 may include volatile memory 1121 and non-volatile memory 1122.

The processor 1110 may provide an output signal to the user interface 1161 based on the determination of misalignment, where the output signal can be used to alert operators or activate further inspection or correction processes.

The display module 1140 may output visual information (images) to the user. The display module 1140 may include the display panel 1141, a gate driver, the source driver, a voltage generation circuit, and a touch screen 1142. The display module 1140 may further include a window, a chassis, and a bracket to protect the display panel 1141. The display module 1140 may include at least a part of the configuration of the display device shown in FIG. 1.

The user interface 1161 serves as the interaction medium between a user and the electronic device 1000. The user interface 1161 may detect an input by a part (e.g., finger) of a user's body or an input by a pen or a mouse, and generate an electric signal or data value corresponding to the input. The user interface 1161 includes the fingerprint sensor 1162, the input sensor 1163, and a digitizer 1164.

The fingerprint sensor 1162 may sense a fingerprint for biometric recognition of the user and may also measure one or more biological signals such as blood pressure, moisture, or body mass.

The input sensor 1163 may sense user interactions including touch, tap, gesture, motion, spoken command, and eye movement. The input sensor 1163 includes optical sensors for image capture, eye tracking, or motion and gesture detection. Optical sensors may be infrared or semiconductor photodetectors. The input sensor 1163 includes audio and acoustic sensors, which may be MEMS microphones for voice recognition or sound-based interaction. The audio and acoustic sensors can be installed as part of the user interface 1161 or embedded in the display panel 1141.

The digitizer 1164 may generate a data value corresponding to coordinate information of input by a pen or a mouse to control movement of an onscreen cursor. The digitizer 1164 may generate the amount of change in electromagnetic due to the input as the data value. The digitizer may detect an input by a passive pen or transmit and receive data with an active pen or a remote.

At least one of the fingerprint sensor 1162, the input sensor 1163, or the digitizer 1164 may be implemented as a sensor layer formed on the top layer of the display panel 1141 through a continuous process with a process of forming elements (for example, the light emitting element, the transistor, and the like) included in the display panel 1141.

In addition, the user interface 1161 may further include, for example, a gesture sensor, a gyro sensor that senses rotational movements, an acceleration sensor to track translational movement, a grip sensor, a pressure sensor, a proximity sensor, a color sensor, an infrared (IR) emitter and camera sensor for tracking gaze direction and eye movements, a temperature sensor, or a light sensor. For example, the gyro sensor, acceleration sensor, and infrared emitter and camera may be particularly suitable for AR/VR headset functions.

The touch screen 1142 includes touch sensors embedded in semiconductor layers of the display panel 1141 to sense pressure applied to the top layer (screen) of the display panel 1141. The touch sensors can be a capacitive or a resistive type. The touch screen 1142 may serve as the primary interface for the user to select and navigate applications, control, and interact with the electronic device 1000.

The display panel 1141 (or display) may include a liquid crystal display panel, an organic light emitting display panel, or an inorganic light emitting display panel, and the type of the display panel 1141 is not particularly limited. The display panel 1141 may be of a rigid type or a flexible type that can be rolled or folded. The display module 1140 may further include a supporter, bracket, heat dissipation member, and the like that support the display panel 1141. The display panel 1141 may include the display unit shown in FIG. 1.

The power source module 1150 may supply power to the components of the electronic device 1000. The power source module 1150 may include a battery that charges the power source voltage. The battery may include a non-rechargeable primary battery or a rechargeable secondary battery or fuel cell. The power source module 1150 may include a power management integrated circuit (PMIC). The PMIC may supply optimized power source to each of the components described above including the display module 1140

Although embodiments of the present disclosure have been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification.

What is claimed is:

1. A display device comprising:

a first pixel connected to a data line and configured to operate in response to a previous first scan signal, a current first scan signal, and a second scan signal; and a second pixel connected to the data line and configured to operate in response to the current first scan signal, a next first scan signal, and the second scan signal, wherein the first pixel and the second pixel are disposed in the same row, wherein a first period in an active period of the current first scan signal overlaps an active period of the previous first scan signal, and wherein a second period of the active period of the current first scan signal overlaps an active period of the next first scan signal.

2. The display device of claim 1, wherein during the first period, a data signal provided to the data line is provided to the first pixel, and during the second period, a data signal provided to the data line is provided to the second pixel.

3. The display device of claim 1, wherein the previous first scan signal, the current first scan signal, and the next first scan signal sequentially transition to active levels.

4. The display device of claim 1, wherein the first pixel comprises:

a first capacitor;

a first switching circuit configured to electrically connect the data line to the first capacitor in response to the previous first scan signal and the current first scan signal; and a first emission circuit configured to receive the second scan signal and to emit light in response to a data signal stored in the first capacitor.

5. The display device of claim 4, wherein the first switching circuit comprises:

a first transistor connected between the first capacitor and a first node and including a gate electrode that receives the previous first scan signal; and a second transistor connected between the first node and the data line and including a gate electrode that receives the current first scan signal.

6. The display device of claim 4, wherein the second pixel comprises:

a second capacitor;

a second switching circuit configured to electrically connect the data line to the second capacitor in response to the current first scan signal and the next first scan signal; and a second emission circuit configured to receive the second scan signal and to emit light in response to a data signal stored in the second capacitor.

7. The display device of claim 6, wherein the second switching circuit comprises:

a third transistor connected between the second capacitor and a second node and including a gate electrode that receives the next first scan signal; and a fourth transistor connected between the second node and the data line and including a gate electrode that receives the current first scan signal.

8. The display device of claim 1, wherein the first pixel comprises:

an eleventh transistor connected between a first voltage line and an eleventh node and including a gate electrode connected to a twelfth node;

a twelfth transistor connected between the twelfth node and a thirteenth node and including a gate electrode that receives the previous first scan signal;

a thirteenth transistor connected between the thirteenth node and a fourteenth node and including a gate electrode that receives the current first scan signal;

a fourteenth transistor connected between the fourteenth node and the eleventh node and including a gate electrode that receives the second scan signal;

a first light emitting element connected between the eleventh node and a second voltage line; and a first capacitor connected between the twelfth node and a third voltage line.

9. The display device of claim 8, wherein during the first period, the twelfth transistor and the thirteenth transistor are turned on.

10. The display device of claim 8, wherein the second pixel comprises:

a 21st transistor connected between the first voltage line and a 21st node and including a gate electrode connected to a 22nd node;

a 22nd transistor connected between the 22nd node and a 23rd node and including a gate electrode that receives the next first scan signal;

a 23rd transistor connected between the 23rd node and a 24th node and including a gate electrode that receives the current first scan signal;

a 24th transistor connected between the 24th node and the 21st node and including a gate electrode that receives the second scan signal;

a second light emitting element connected between the 21st node and the second voltage line; and a second capacitor connected between the 22nd node and the third voltage line.

11. The display device of claim 10, wherein during the second period, the 22nd transistor and the 23rd transistor are turned on.

12. An electronic device comprising:

a display panel including a plurality of pixels, a plurality of first scan lines, a plurality of second scan lines, and a plurality of data lines;

a scan driving circuit configured to provide first scan signals and second scan signals to the plurality of first scan lines and the plurality of second scan lines, respectively; and a data driving circuit configured to provide data signals to the plurality of data lines, wherein the plurality of pixels comprises:

a first pixel disposed in a current row, connected to a first data line among the plurality of data lines, and configured to operate in response to a previous first scan signal, a current first scan signal, and a second scan signal; and a second pixel disposed in the current row, connected to the first data line, and configured to operate in response to the current first scan signal, a next first scan signal, and the second scan signal, wherein a first period in an active period of the current first scan signal overlaps an active period of the previous first scan signal, and wherein a second period of the active period of the current first scan signal overlaps an active period of the next first scan signal.

13. The electronic device of claim 12, wherein the first pixel comprises:

a first capacitor;

a first switching circuit configured to electrically connect the first data line to the first capacitor in response to the previous first scan signal and the current first scan signal; and a first emission circuit configured to receive the second scan signal and to emit light in response to a data signal stored in the first capacitor.

14. The electronic device of claim 13, wherein the first switching circuit comprises:

a first transistor connected between the first capacitor and a first node and including a gate electrode that receives the previous first scan signal; and a second transistor connected between the first node and the first data line and including a gate electrode that receives the current first scan signal.

15. The electronic device of claim 13, wherein the second pixel comprises:

a second capacitor;

a second switching circuit configured to electrically connect the first data line to the second capacitor in response to the current first scan signal and the next first scan signal; and a second emission circuit configured to receive the second scan signal and to emit light in response to a data signal stored in the second capacitor.

16. The electronic device of claim 15, wherein the second switching circuit comprises:

a third transistor connected between the second capacitor and a second node and including a gate electrode that receives the next first scan signal; and a fourth transistor connected between the second node and the first data line and including a gate electrode that receives the current first scan signal.

17. The electronic device of claim 12, wherein the first pixel comprises:

an eleventh transistor connected between a first voltage line and an eleventh node and including a gate electrode connected to a twelfth node;

a twelfth transistor connected between the twelfth node and a thirteenth node and including a gate electrode that receives the previous first scan signal;

a thirteenth transistor connected between the thirteenth node and a fourteenth node and including a gate electrode that receives the current first scan signal;

a fourteenth transistor connected between the fourteenth node and the eleventh node and including a gate electrode that receives the second scan signal;

a first light emitting element connected between the eleventh node and a second voltage line; and a first capacitor connected between the twelfth node and a third voltage line.

18. The electronic device of claim 17, wherein during the first period, the twelfth transistor and the thirteenth transistor are turned on.

19. The electronic device of claim 17, wherein the second pixel comprises:

a 21st transistor connected between the first voltage line and a 21st node and including a gate electrode connected to a 22nd node;

a 22nd transistor connected between the 22nd node and a 23rd node and including a gate electrode that receives the next first scan signal;

a 23rd transistor connected between the 23rd node and a 24th node and including a gate electrode that receives the current first scan signal;

a 24th transistor connected between the 24th node and the 21st node and including a gate electrode that receives the second scan signal;

a second light emitting element connected between the 21st node and the second voltage line; and a second capacitor connected between the 22nd node and the third voltage line, wherein during the second period, the 22nd transistor and the 23rd transistor are turned on.

20. A display device comprising:

a display panel including a plurality of pixels, the plurality of pixels comprising:

a first pair of pixels disposed in a first row and connected to a same data line; and a second pair of pixels disposed in a second row and connected to a same data line; and a scan driving circuit configured to:

apply a previous first scan signal, a current first scan signal and a second scan signal to the first pair of pixels; and apply the current first scan signal, a next first scan signal and the second scan signal to the second pair of pixels, wherein a first period in an active period of the current first scan signal overlaps an active period of the previous first scan signal, and wherein a second period in the active period of the current first scan signal overlaps an active period of the next first scan signal.

* * * * *